Dec. 14, 1948.　　　　R. A. CLAPP　　　　2,455,918
MOTION PICTURE PROJECTOR

Filed June 23, 1945　　　　4 Sheets-Sheet 1

INVENTOR.
ROY A. CLAPP.
BY *Paul, Paul & Moore*

ATTORNEYS

Dec. 14, 1948.  R. A. CLAPP  2,455,918
MOTION PICTURE PROJECTOR
Filed June 23, 1945  4 Sheets-Sheet 2
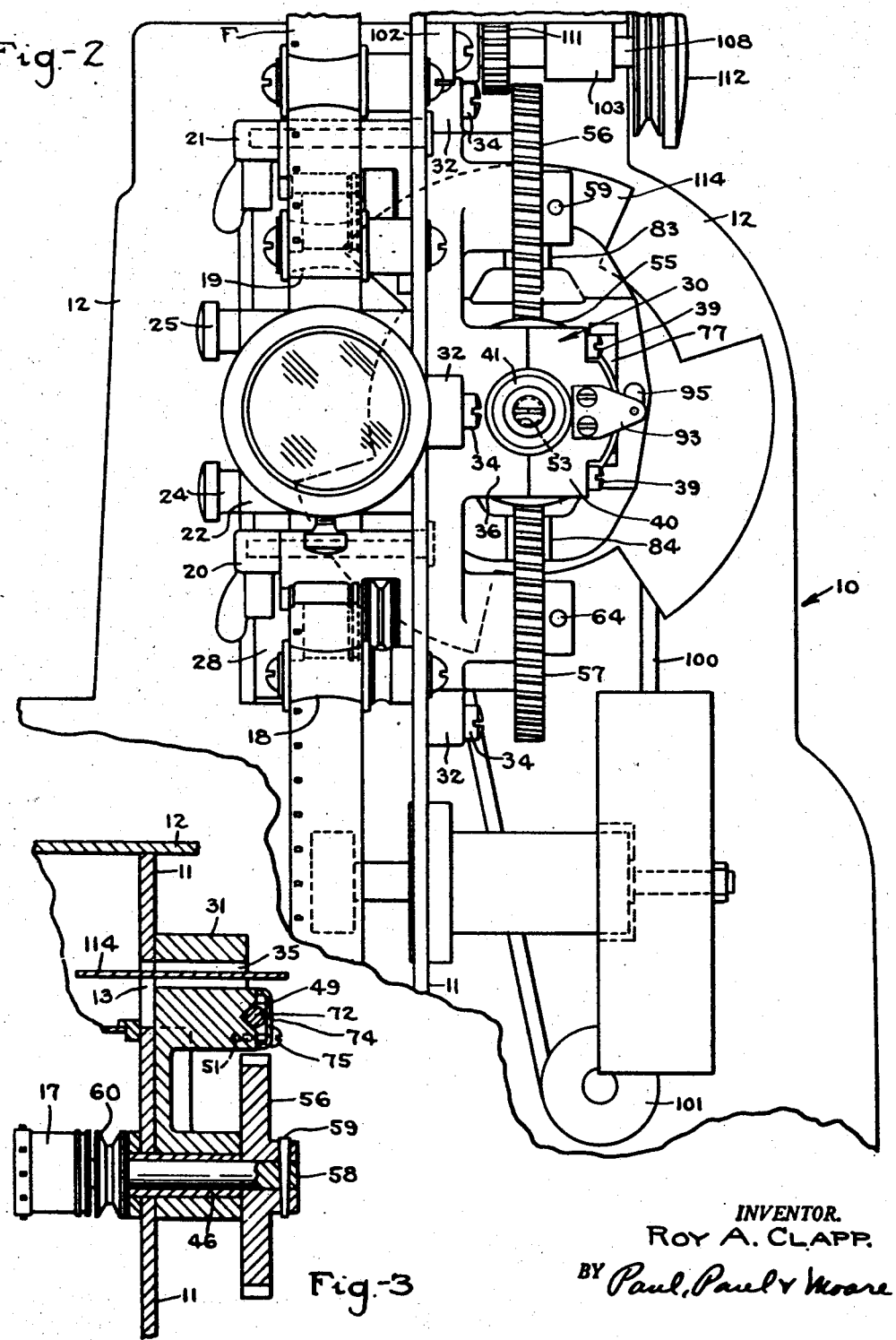
INVENTOR.
ROY A. CLAPP.
BY Paul, Paul & Moore
ATTORNEYS.

Dec. 14, 1948.  R. A. CLAPP  2,455,918
MOTION PICTURE PROJECTOR
Filed June 23, 1945  4 Sheets-Sheet 3

INVENTOR.
ROY A. CLAPP.
BY Paul, Paul + Moore
ATTORNEYS.

Dec. 14, 1948.  R. A. CLAPP  2,455,918
MOTION PICTURE PROJECTOR
Filed June 23, 1945  4 Sheets-Sheet 4
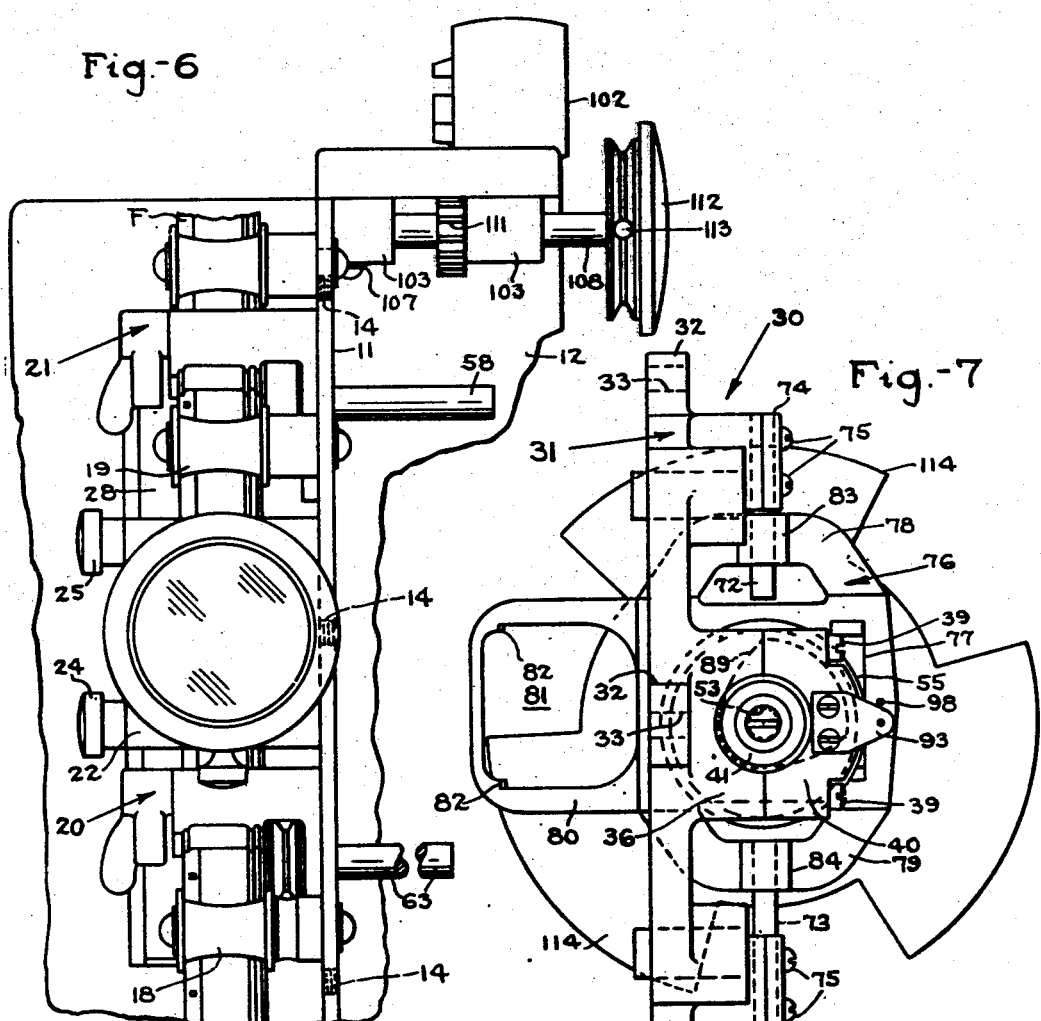
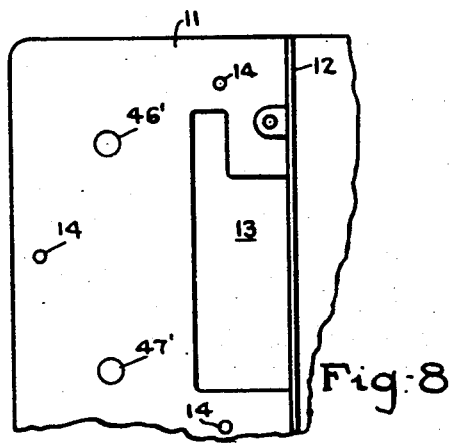
INVENTOR:
ROY A. CLAPP.
BY Paul, Paul & Moore
ATTORNEYS.

Patented Dec. 14, 1948

2,455,918

UNITED STATES PATENT OFFICE 2,455,918

MOTION-PICTURE PROJECTOR

Roy A. Clapp, Minneapolis, Minn., assignor, by mesne assignments, to Argus, Incorporated, Ann Arbor, Mich., a corporation of Michigan Application June 23, 1945, Serial No. 601,091

5 Claims. (Cl. 88—18.4)

1

This invention relates to improvements in motion picture projectors and more particularly to improvements in mechanisms of the intermittent feed type which are capable of ready manufacture at economical cost, easy servicing, and replacement of parts. More particularly the invention relates to improvements in the frame and mechanism construction permitting the film feeding mechanism to be removed and replaced or repaired as a unit.

It is also an object of the invention to provide a unit construction film feeding mechanism which may be assembled or disassembled as a unit from a motion picture projector.

Other and further objects of the invention are those inherent in the apparatus herein illustrated, described and claimed.

The invention is illustrated with reference to the drawings in which

Figure 2 is a fragmentary front elevational view of the apparatus of Figure 1 in place on the projector and also showing the film feed sprockets, lens block and sound roller;

Figure 3 is a fragmentary sectional view taken along the lines 3—3 of Figure 1;

Figure 6 is a fragmentary front elevational view with the film feed sub-assembly removed;

Figure 7 is a front elevational view of the film feed sub-assembly as removed from the machine;

Figure 8 is a fragmentary side elevational view of the central vertical frame member of the projection apparatus; and Figure 9 is a sectional view of one of the sprocket shaft drive gears.

Figure 1:
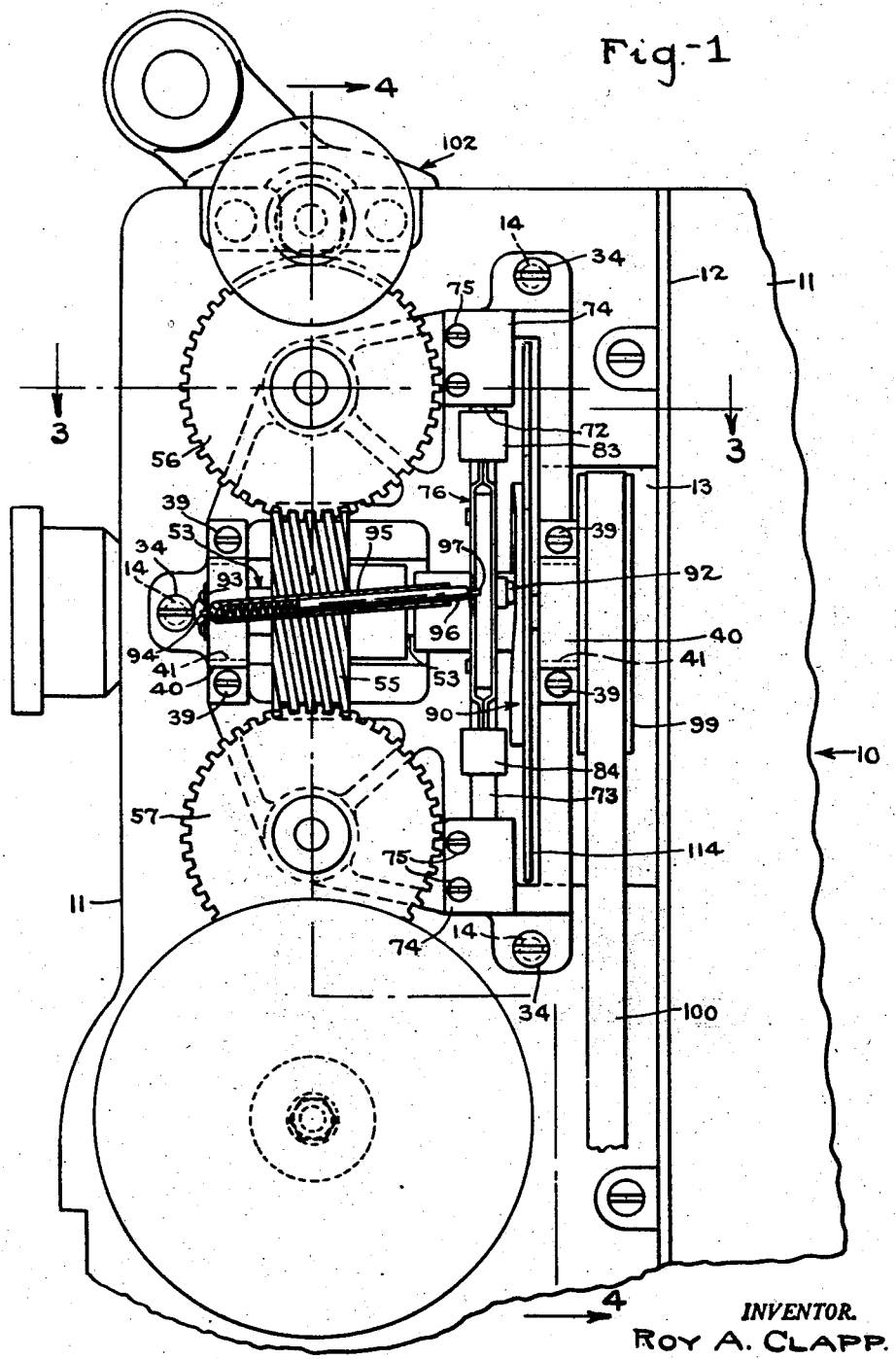
Figure 1 is a fragmentary side elevational view of a motion picture projector showing the unit construction from the left side.

Referring to the drawings the projector main frame generally designated 10 includes a central vertical panel 11 arranged longitudinally of the machine in the fore and aft (projecting) direction and a central transverse stiffening and housing panel 12. The vertical panel 11 is provided with a cut-out portion 13 as shown in Figure 8 and is provided with a plurality of threaded apertures 14 for receiving the sub-assembly attachment screws and two apertures 46' and 47' for receiving and aligning the sprocket shaft bushings as hereinafter described.

Figures 4, 5:
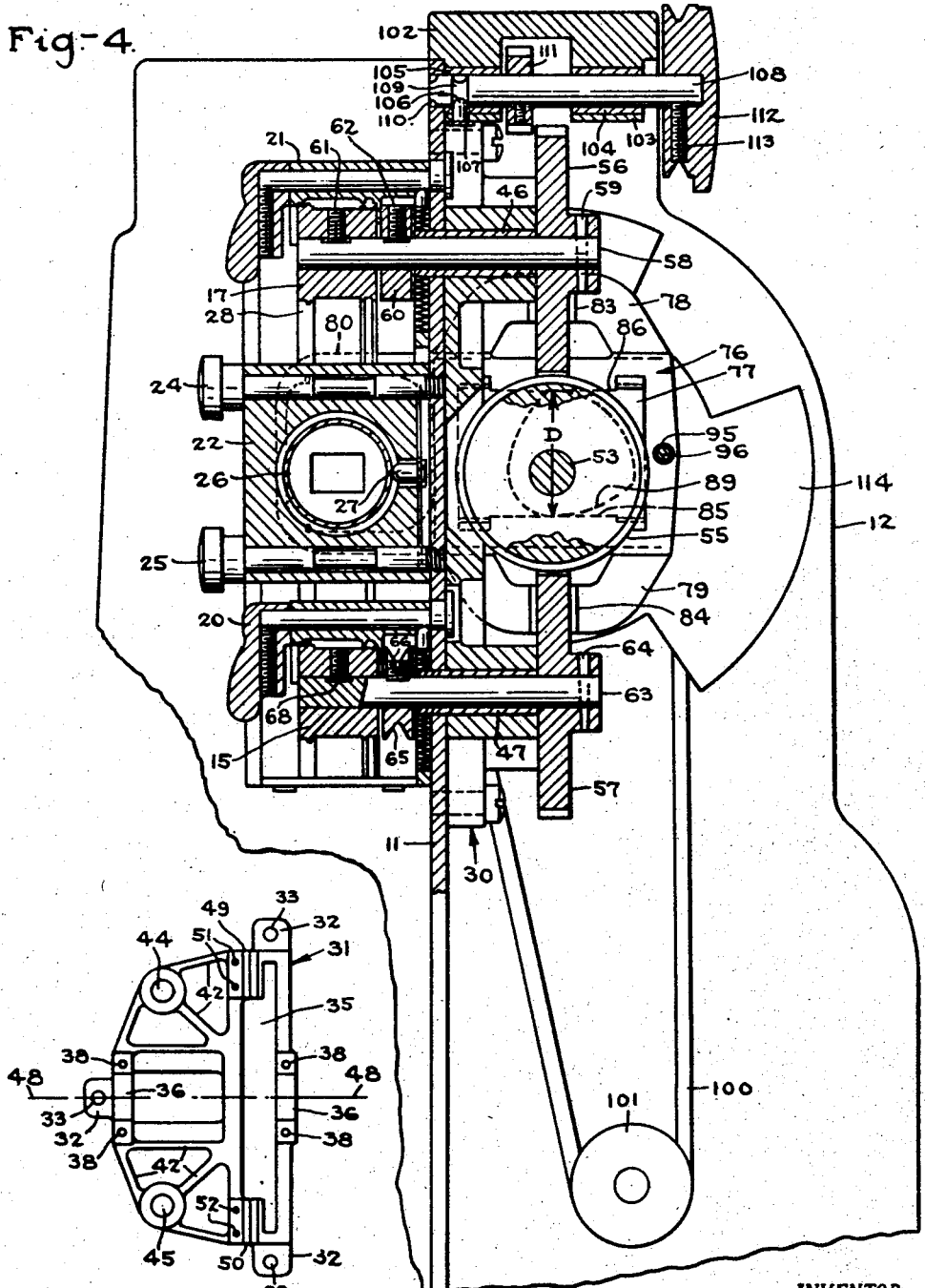
Figure 4 is a fragmentary front sectional view taken along the lines 4—4 of Figure 1.
Figure 5 is a side elevational view of the sub-assembly frame as it appears when removed from the projector.

Referring to Figures 2, 4 and 6 to the right

2 hand side of the main frame panel 11 as viewed in the projection direction, (and at the left hand side, as shown in the drawings) there are provided film feeding sprockets 15 and 17 which are mounted and driven as hereinafter described. Adjacent sprocket 15 is a guide roll 18 and adjacent sprocket 17 is a guide roll 19. Above the sprocket 15 is a film guide and clamping arrangement generally designated 20. A similar film guide and clamp generally designated 21 is shown adjacent sprocket 17. Between sprockets 15 and 17 there is provided a removable lens block 22, which is held in place by thumb screws 24 and 25 which are threaded into the central frame panel 11 as shown in Figure 4. The lens block is provided with a focusing arrangement generally designated 26 which is provided with a frictional detent 27.

The sprocket 17 when rotated at a uniform rate serves to feed film F through the raceway 28 from which it is withdrawn at a uniform rate by the sprocket 15.

On the left-hand side of the panel 11, as viewed in the projecting direction (to the right as shown in Figures 2, 4 and 6), there is mounted a sub-assembly generally designated 30, shown in Figure 7, which is the drive for intermittently feeding the film, step-by-step, through the raceway and also for rotating the sprockets 15 and 17 at a uniform rate, all for progressing the film through the projecting apparatus. As shown in Figure 7, the film feeding sub-assembly includes a sub-frame member generally designated 31 having the shape and configuration shown in Figure 5. The frame 31 has a finished, flat mounting surface at the left, as shown in Figure 7, and has three mounting lugs 32 provided with holes 33 located as to overlie the threaded holes 14 in the frame panel 11, Figure 8.

The sub-assembly frame 31, having opening 35 therein for alignment with opening 13, see Figures 1, 3, 5 and 7, includes a pair of split bearing supports 36 provided with threaded holes 38 for receiving the retaining screws 39, Figure 7, which hold the bearing retaining cap 40 in place. A high quality ball bearing 41 may thus be clamped in place in each bearing support 36. The sub-assembly frame 31 is also provided with a plurality of stiffening webs 42 and with a pair of apertures 44 and 45 into which there are pressed the bearing metal bushings 46 and 47, respectively, as shown in Figures 3 and 4. It may be noted that the bushings 46 and 47 protrude through locating apertures 46' and 47', respectively, in the vertical frame panel 11 when the sub-assembly is in place thereon. The bushings 46 and 47 thus serve as very accurate locating pins for readily locating the sub-assembly frame and in addition serve as bearing supports for a pair of sprocket shafts, as hereinafter described. The bushings 46 and 47 are located equal distances above and below the center line 48—48, Figure 5.

The sub-assembly frame, Figures 3 and 5, is also provided with a pair of vertical V notches 49 and 50 which are vertically aligned, and at the side of each V notch there are a pair of threaded openings 51 and 52 respectively, for attaching a clamp as hereinafter described.

Referring to Figures 1, 2, 3, 4 and 7 it will be observed that the sub-assembly frame 31 serves as a support for a drive shaft, generally designated 53 which is journaled in the ball bearings 41—41, the latter in turn being supported by the bearing supports 36—36. Between the bushing journals 46—47 there is located a worm gear 55 which meshes with a pair of mating sprocket shaft drive gears 56 and 57, which are of equal diameters and of a size such that both will mesh neatly with the worm gear 55. The sprocket drive gear 56 is mounted upon the upper sprocket shaft 58 to which it is pinned by means of the tapered pin 59. The shaft 58 is journaled in the bushing 46 and extends through the vertical panel 11 of the main frame. Upper sprocket 17 and a spacing collar 60 are mounted on shaft 58 the sprocket and collar being fastened to the shaft 58 by means of set screws 61 and 62, respectively. The lower sprocket driving gear 57 is supported upon the shaft 63 to which it is likewise keyed by means of the tapered pin 64. The shaft 63 likewise extends through the vertical frame panel 11 and upon it there is mounted the lower drive sprocket 15 and a drive pulley 65. The pulley is attached by means of a set screw 66 and the drive sprocket 15 is attached by means of a set screw 68. The pulley 65 serves as a drive pulley for a belt, not illustrated, extending to the lower film reel on which the film is wound after projection.

Referring to Figures 1, 3 and 7, in the V notches 49 and 50 there are placed a pair of axially aligned hardened steel pins 72 and 73. The pins rest in the V groove 49 and 50 and are held in placed by clamping plates 74—74, the plates in turn being held in place by screws 75. The pins 72 when in place in the grooves 49—50 are axially aligned and the axis of the pins 72 and 73 is located so as to intersect the axis of the drive shaft 53. The pins 72—73 serve as a mounting for a shuttle generally designated 76, Figures 2, 4 and 7, which has a central aperture 77, a top arch 78, a bottom arch 79 and an offset portion 80 having the aperture 81 therein through which the picture is projected. The offset portion 80 is provided with film engaging claws 82. The top arch 78, Figure 7, is provided with a slide bearing 83 and the bottom arch with a slide bearing 84, the bearing being received on the pins 72 and 73. The shuttle 76 is thus permitted to slide vertically on the pins 72—73 and also to rotate about said pins.

The central aperture 77 of the shuttle 76 has parallel horizontal cam engaging surfaces 85 and 86, Figure 4, with which a cam 89, mounted upon drive shaft 53, cooperates. As the shaft 53 rotates the cam 89 moves the shuttle 76 up and down in an oscillating motion in a vertical direction. The cam 89 is shaped so as to have a constant trans-axial dimension D across any line running through the center of shaft 53, this dimension being equal to the spacing between the cam engaging surfaces 85 and 86 of the shuttle, proper clearance for free action being provided. Thus, as the shaft 53 rotates the shuttle is moved up and down.

The in and out motion of the shuttle for the purpose of moving the claws 82 toward and away from the film and thus into and out of engagement with the perforations of the film is provided by a second cam generally designated 90. Cam, 90, Figure 1, is mounted upon and rotates with the drive shaft 53. The shuttle is provided with a suitable cam engaging button 92 which rides upon the cam 90 and hence as the drive shaft rotates the shuttle is oscillated slightly about the axis of the pins 72—73.

Upon the bearing cap 40 near worm gear 55, Figures 1 and 7, there is mounted a bracket 93 which serves to support the tip end 94 of a tubular member 95 which is provided with an internal spiral spring bearing against a tube 96 which slides in the tube 95. The tube 96 is likewise provided with a tip 97 which is inserted in a suitable aperture 98 in the shuttle. Thus, the spring member or lever 95—96 serves to rotate the shuttle in a direction so as to maintain the cam engaging button 92 constantly in engagement with the cam 90.

Immediately against cam 90 there is provided a shutter 114, and at the rear end of the shaft 53 there is provided a V-belt pulley 99 upon which a V belt 100 is adapted to operate. The V belt extends into the base of the machine to a motor pulley 101, Figure 2.

To the upper part of the vertical main frame panel 11 there is attached a reel supporting bracket generally designated 102 having downwardly protruding spaced bearing brackets 103 which are provided with bushings 104 and 105. The bushing 105 is apertured to receive a rounded detent rod 106 which is pressed into place by means of a leaf spring 107. The bushings 104 and 105 serve to support a shaft 108 which is provided with a detent groove 109 and a detent edge 110. Upon the shaft is mounted a gear 111 which in Figure 4 is out of mesh with the upper sprocket drive gear 56, and a combined knob and pulley 112 which is attached to the shaft 108 by means of screw 113. When the knob-pulley 112 is drawn to the right as shown in Figure 4, the entire shaft 108 moves, thus forcing detent 106 out of the groove 109 and against the edge 110, thus maintaining the shaft in position such that the gear 111 meshes with gear 56. In this position the knob-pulley 112 is rotated and serves as a drive for rotating the upper film reel, not illustrated, for rewinding purposes.

In a moving picture projector of the intermittent feed type, the most rapidly moving parts are the shuttle and its actuating mechanism, and these parts are subject to the maximum amount of wear and require most frequent servicing. By means of the sub-assembly frame 31 of the present invention, the entire film progressing mechanism mounted thereon may very conveniently be removed for servicing or replacement. Thus, frame 31 which is held in place by only three screws, viz, screws 34, may be removed in either of two fashions for servicing or replacement. Where it is desired not to disturb the sprockets 15—17 and the remaining apparatus on the lens block side of the frame panel 11, the removal is accomplished by removing gears 56 and 57 from their shafts, which is done by simply removing the tapering pins 59 and 64. The gears 56 and 57 are then slipped off their shafts 58 and 63, respectively, and then by removing screws 34 and the V belt 100, the entire film actuating mechanism sub-assembly may be lifted off as a unit and a repaired or a new or replacement unit inserted. The unit thus removed appears as in Figure 7 and includes the shaft 53, the worm gear 55, bearing cap 40, bearings 41, cams 89 and 90, the shuttle 76 and the pulley 99, as well as the light shutter 114 which is mounted on the shaft 53 immediately behind the cam 90. The entire unit may thus be taken to the bench for repair or simply a replacement unit inserted in the projector. The projector may thus be kept in service with a minimum of servicing interruption. Alternatively, where desired, the upper film sprocket 17 and spacer 60 may be removed by loosening their set screws 61 and 62, respectively, and the lower film sprocket 15 and pulley 65 removed by loosening set screws 68 and 66. When this is done the film feeding assembly may be removed by simply withdrawing the screws 34 and in this case the sprocket shafts 58 and 63 as well as the sprocket drive gears 56 and 57 are likewise removed from the machine.

By either method of servicing the entire replacement and servicing operation can be accomplished in a few minutes time.

As many apparently widely different embodiments of this invention may be made without departing from the spirit and scope thereof, it is to be understood that I do not limit myself to the specific embodiments herein except as defined by the appended claims.

What I claim is:

1. In a motion picture projector, a main support having an upright wall extending in the direction of the projection axis, a sub-frame removably mounted on one side of said wall, a main shaft rotatably mounted on said sub-frame and extending substantially in the same direction as said axis, cam means on said main shaft, a shutter on said main shaft, two transverse sprocket shafts rotatably mounted on said sub-frame above and below said main shaft, said sprocket shafts extending through apertures in said wall, sprockets on said sprocket shafts, on the other side of said wall, means on said sub-frame connecting said sprocket shafts to be driven by said main shaft, a claw feed device mounted on said sub-frame in operative association with said cam means, a projection lens assembly mounted on said other side of said wall at a level intermediate said sprockets and means for guiding the film between said sprockets past a projection aperture rearwardly of said lens assembly, said wall being apertured rearwardly of the lens assembly to permit said shutter to extend through said wall into the projection light path and permit said claw feed device to extend through said wall into engagement with the film between said sprockets for intermittently advancing said film past the projection aperture.

2. In the motion picture projector defined in claim 1, said sprockets being removably mounted on said sprocket shafts whereby, upon removal of said sprockets the entire sub-frame and the film feed and shutter parts mounted on it, including the sprocket shafts, may be removed as a unitary sub-assembly from the projector.

3. In the motion picture apparatus defined in claim 1, said drive connection between the main and sprocket shafts comprising a gear on the main shaft and a gear on each sprocket shaft meshed with said main shaft gear, said sprocket shaft gears being removable from the end of the sprocket shafts opposite the sprockets whereby upon removal of said sprocket shaft gears the entire sub-frame with the intermittent feed and shutter parts mounted on it may be removed as a unitary subassembly from the projector, leaving the sprocket shafts and sprockets undisturbed.

4. In the motion picture projector defined in claim 1, bearing sleeves in which said sprocket shafts are rotatably supported rigidly mounted on said wall at the sprocket shaft apertures and projecting from said one side of said wall, and apertured bosses on said sub-frame through which said sleeves project whereby said sleeves also serve to locate the sub-frame in its assembly with said wall.

5. In an intermittent feed mechanism for a motion picture apparatus, a rotatable shaft, a rigid shuttle member extending transversely of said shaft having pivot and slide guide mountings both above and below said shaft enabling said shuttle member to rock about an axis intersecting the axis of said shaft and slide parallel to said rock axis, a film engaging claw tooth on said shuttle member projecting in the direction of said shaft axis, a cam on said shaft adapted during rotation of said shaft to reciprocate said shuttle member parallel to said rock axis, a second cam on said shaft and resilient means maintaining engagement between said second cam and said shuttle member for rocking said shuttle member about said rock axis in synchronism with said reciprocation for positively inserting and withdrawing said claw with respect to the film sprocket holes, said resilient means comprising a lever comprising a pair of telescoped members connected by an external spring that tends to axially separate them, and said lever being maintained under axial compression between a stationary part of the apparatus and the end of said shuttle member remote from said claw.

ROY A. CLAPP.

REFERENCES CITED

The following references are of record in the file of this patent:

UNITED STATES PATENTS

| Number | Name | Date |
| --- | --- | --- |
| 1,292,448 | Emory | Jan. 28, 1919 |
| 1,305,154 | O'Hara | May 27, 1919 |
| 1,587,955 | Howell | June 8, 1926 |
| 1,620,726 | Howell | Mar. 15, 1927 |
| 1,821,946 | Owens | Sept. 8, 1931 |
| 1,957,201 | Dina | May 1, 1934 |
| 2,027,678 | Debrie | Jan. 14, 1936 |
| 2,051,602 | Holden | Aug. 18, 1936 |
| 2,351,886 | Sperry | June 20, 1944 |